United States Patent
Ross

(10) Patent No.: US 9,398,809 B2
(45) Date of Patent: Jul. 26, 2016

(54) INTERACTIVE MOBILE WHITEBOARD PANEL SYSTEM

(71) Applicant: George Ross, Lee's Summit, MO (US)

(72) Inventor: George Ross, Lee's Summit, MO (US)

( * ) Notice: Subject to any disclaimer, the term of this patent is extended or adjusted under 35 U.S.C. 154(b) by 0 days.

(21) Appl. No.: 14/745,111

(22) Filed: Jun. 19, 2015

(65) Prior Publication Data

US 2015/0366349 A1 Dec. 24, 2015

Related U.S. Application Data

(60) Provisional application No. 62/014,252, filed on Jun. 19, 2014.

(51) Int. Cl.
| | |
|---|---|
| *A47B 97/00* | (2006.01) |
| *G06F 1/16* | (2006.01) |
| *F16M 11/04* | (2006.01) |
| *F16M 11/42* | (2006.01) |
| *F16M 13/02* | (2006.01) |
| *G09B 5/02* | (2006.01) |

(52) U.S. Cl.
CPC ............ *A47B 97/001* (2013.01); *F16M 11/045* (2013.01); *F16M 11/425* (2013.01); *F16M 13/02* (2013.01); *G06F 1/1679* (2013.01); *G09B 5/02* (2013.01); *Y10T 29/49119* (2015.01)

(58) Field of Classification Search
CPC . G06F 1/1601; G06F 3/04883; G06F 1/1679; A47B 97/00; F16M 11/045; F16M 11/425; F16M 13/02; G09B 5/02; Y10T 29/49119
USPC ...................................... 361/679.29; 345/173
See application file for complete search history.

(56) References Cited

U.S. PATENT DOCUMENTS

| | | | | |
|---|---|---|---|---|
| 6,295,038 B1* | 9/2001 | Rebeske | ............... | G06F 1/1616 345/1.1 |
| 6,532,146 B1* | 3/2003 | Duquette | ............. | G06F 1/1607 361/679.04 |
| 6,643,127 B1* | 11/2003 | Richardson | ........... | G06F 1/1632 312/223.4 |
| 6,778,383 B2* | 8/2004 | Ho | ........................ | G06F 1/1607 248/917 |
| 6,844,865 B2* | 1/2005 | Stasko | ................... | F16M 11/00 345/1.3 |
| 7,242,394 B2* | 7/2007 | Lahade | ................... | G06F 3/041 178/18.01 |
| 7,684,185 B2* | 3/2010 | Farrugia | ............... | G06F 1/1632 248/918 |
| 7,782,274 B2* | 8/2010 | Manning | ............... | G06F 1/1616 345/1.1 |
| D650,784 S * | 12/2011 | Feldstein | ..................... | D14/434 |
| 8,167,256 B1* | 5/2012 | Bishop | .................. | F16M 11/24 248/200 |
| 8,582,299 B1* | 11/2013 | Phillips | ................ | H05K 7/1489 361/724 |
| 2002/0039074 A1* | 4/2002 | England | ................ | G06F 1/1622 341/22 |
| 2004/0194361 A1* | 10/2004 | Furlan | .................... | G09F 15/00 40/601 |
| 2004/0239640 A1* | 12/2004 | Lahade | .................. | G06F 3/041 345/173 |
| 2007/0086154 A1* | 4/2007 | Koch | .................... | G06F 1/1632 361/679.27 |
| 2007/0247798 A1* | 10/2007 | Scott, II | ................ | G06F 1/1616 361/679.04 |
| 2008/0144293 A1* | 6/2008 | Aksamit | ............. | H05K 7/1489 361/727 |
| 2011/0141672 A1* | 6/2011 | Farley, Jr. | ............... | E05D 3/022 361/679.01 |

* cited by examiner

*Primary Examiner* — Adrian S Wilson
(74) *Attorney, Agent, or Firm* — Arthur K. Shaffer; Intellectual Property Center, LLC

(57) ABSTRACT

The present invention provides a system and method for transmitting wallboard content from a wallboard content server to an interactive wallboard through a data interface hub, said interactive wallboard movable from a home position to an away position.

10 Claims, 11 Drawing Sheets

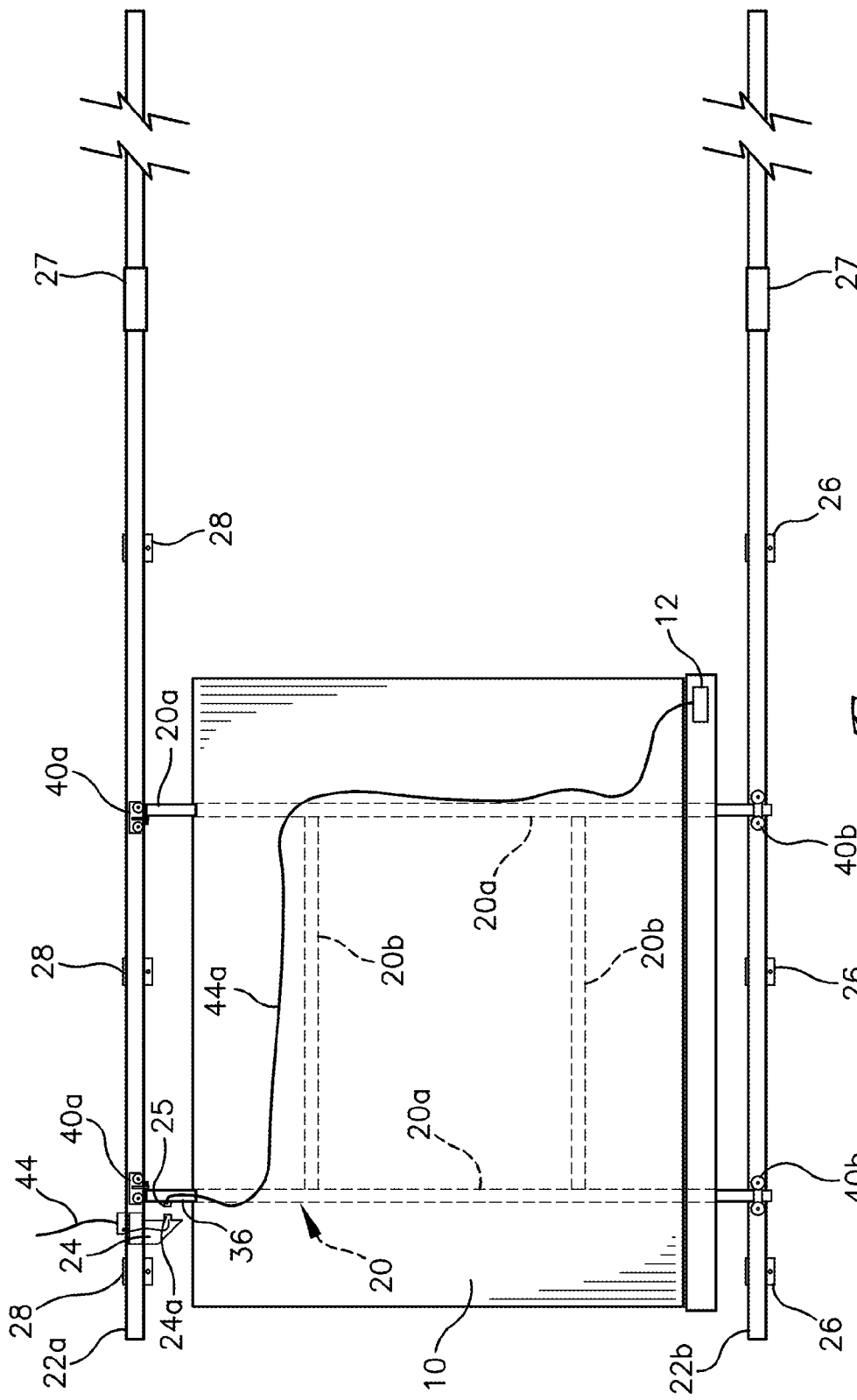

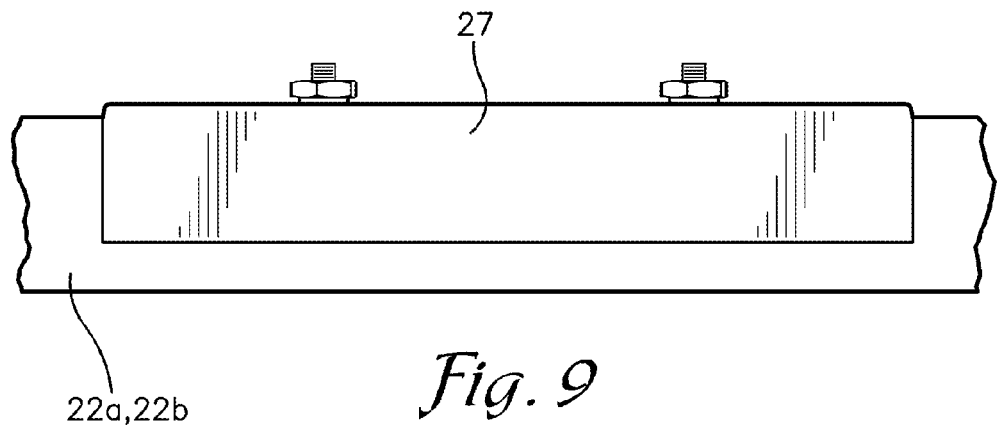
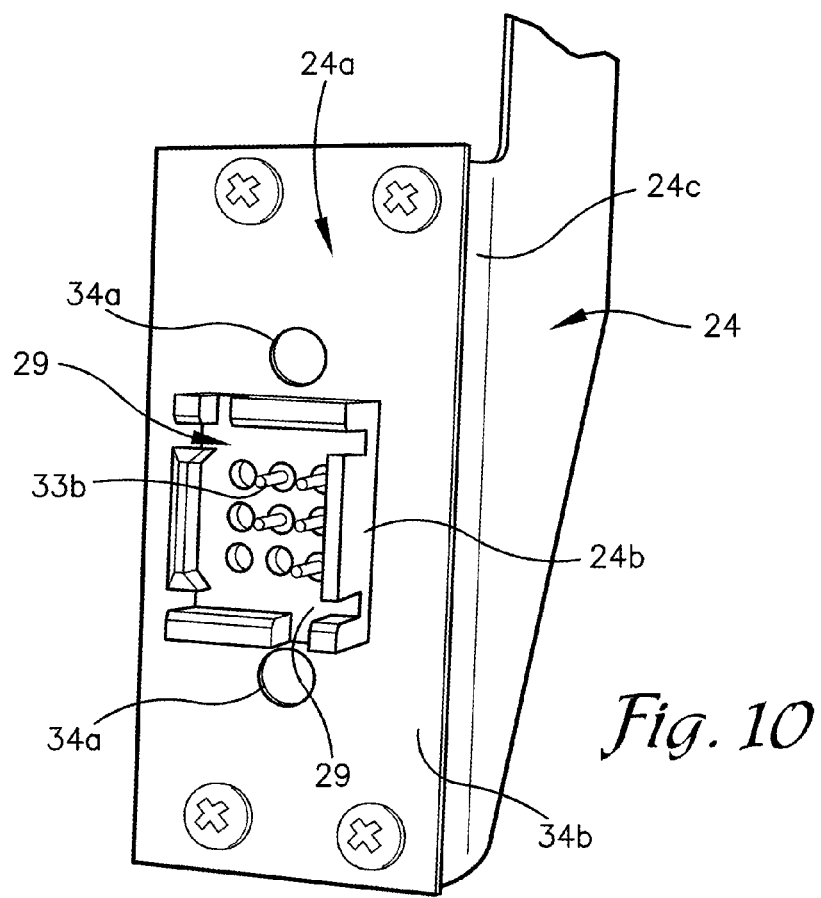

INTERACTIVE MOBILE WHITEBOARD PANEL SYSTEM

FIELD OF THE INVENTION

The present invention is broadly directed to moveable wall panels and, more particularly, to improved mobile whiteboard panel system with a sliding electrical connector.

BACKGROUND OF THE INVENTION

Dry erase boards are used commonly in classroom, church and business settings for assistance in teaching students and audiences of varying age ranges. These dry erase boards may be used by the instructor in a classroom setting for presenting textual or visual illustrations or may be utilized as part of an interactive whiteboard (IWB) in communication with a computer as an input or output device or in connection with a projector as a projection screen. In addition, in some situations, it is desired to transport these interactive white boards around the classroom in conjunction with or to avoid interaction with various room areas or wall surfaces such as a chalkboard, bulletin board, stationary dry erase board or various topical related areas.

In traditional classroom settings, a chalkboard and dry erase board is used by the instructor to present visual and textual material for the students. These boards have been used for generations by teachers to help instruct students. However, these boards lack the type of multi-media support desired in today's classrooms and lack the technological integration which allows a classroom user the ability to integrate various teaching aids like computer, projectors or the like.

Interactive white boards (IWB) such as smart boards are known. Typically, these boards include a framed screen with a computer processor which electronically responds to input from a user and is fixed in a single location within the classroom. IWBs may include a reflective screen which may be used as a projector/presentation screen for use in a classroom setting. IWB may use specialized writing instruments such as pens to record the instrument's movement. Some IWB have specialized display surfaces which are responsive to pressure from a pen, finger or eraser. Some IWBs include a number of buttons around the frame of the screen which may be programmed or preprogrammed in combination with the computer processor to provide a number of features. Additionally, some IWBs include various software to enhance their functionality within the classroom environment such as meeting and collaboration software, subject specific software like math and drafting applications. All of these advancements require communication between the interactive whiteboard and the classroom instructor, specifically; between the computer processor associated with the interactive whiteboard and input data from a user of the interactive whiteboard such as the classroom instructor. These whiteboards however, have limitations. The data processing is typically preformed by the computer processor associated with and received within the whiteboard and stored within a memory storage device associated with the whiteboard such as volatile and non-volatile, temporary and long term memory. Over time, these electronic components fail. In addition, some of the electrical connections are wired to the whiteboard so that the interactive whiteboard has limited mobility. With the move towards computerized processing along with the integration and combination of specialized instruments, display surfaces and functional buttons the interactive whiteboard has moved the classroom instruction away from use of traditional whiteboard and chalkboard surfaces to use more computer-like devices. In addition to the components, the generally available interactive whiteboards themselves have limited life-cycles as well as the software installed on the same. The limited life-cycle software and high potential for failed components increases the costs and decreases the life-cycle of the prior art IWBs and creates limitations based upon future technical advancements and limitations of mobility which the present invention overcomes.

Additionally, a survey of the main disadvantages of IWBs, classroom teachers indicated the main concern was that the current IWB was mounting over their existing classroom boards limiting the usability of their chalk and dry erase boards. In a traditional IWB installation, the IWB is at least 5' long and 3' high and therefore when center mounted on the same classroom walls as existing dry erase board, the IWB eliminates 5' of use from the existing dry erase board. Some classrooms have an 8' dry erase board center mounted on the wall facing students. When you install a 5' IWB board, in a centered manner, only about a 1.5' of usable area on the dry erase board on either side of the IWB remains for classroom use. This present invention addresses this issue by allowing for movement of the IWB by the classroom teacher around the classroom to an area which allows for unobstructed use of classroom chalk and dry erase boards.

During operation the IWB requires various data and power cables to operate. Movement of the traditional IWB would be limited based upon the lengths of these cables which typically is only a few feet. Therefore, movement of prior art IWB is limited to the lengths of these cables or requires for constant unplugging and plugging of these cables, which for a traditional classroom instructor is challenging. Some IWBs may use wireless networking to communicate, however, they still require power. The present invention allows for rapid disconnection and reconnection of IWB cabling such as but not limited to computer communications cabling like USB cables and power cables by providing an improved connector system that allows for disconnection based upon movement of the IWB.

SUMMARY OF THE INVENTION

The present invention includes a mobile wall panel system 8 with a movable interactive white board (referred to herein as IWB and interactive wallboard) 10 mounted on a moveable mounting frame 20 with a first and second roller assembly 40a, 40b the first roller assembly 40a being adapted for receipt by an upper rail 22a and the second roller assembly 40b being adapted for receipt by a lower rail 22b. An electrically conductive floating connector 25 is at least partially secured to the IWB 10 and is adapted for movement with the IWB 10 and adapted for repeated separation from a fixed connector 24a associated with at least one of the upper or lower rails 22a, 22b The upper rail 22a is generally secured to a generally vertical wall surface by at least one upper rail bracket 28 having a generally outward projection distance and preferably being in sufficient number to support the IWB 10 during movement along the wall surface. The lower rail 22b is generally secured to the wall surface by a lower rail bracket 26. The outward projection distance of the lower rail 22b in the illustrated embodiment of FIG. 4 is greater than the outward projection distance of the upper rail 22a, the lower rail 22b being generally coplanar with the upper rail 22a. The lower rail 22b is positioned vertically below the upper rail 22a with an outward projection distance sufficient to allow for movement of the mobile IWB 10 along the vertical wall surface e.g. a classroom wall while avoiding horizontal projections like a chalk tray which may extend outwardly from the vertical wall surface to avoid obstruction during movement of the mobile IWB 10. In operation, the mobile IWB 10 moves from a home position with a first (referred to and illustrated herein as a fixed connector 24a) and second connector (referred to and illustrated herein as a floating connector 25) being electronically coupled for electrical communication between the IWB 10 and a IWB content server 16, also referred to herein as a wallboard content server, to an away position with the first and second connector being electronically uncoupled.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

FIG. 3 is front elevation of an embodiment of a mobile IWB in an away position.

FIG. 9 is a fragmented elevation of an exemplary rail splice bracket in accordance with an aspect of the present invention.

FIG. 10 is a fragmented side perspective illustrating a fixed connector in accordance with one embodiment of the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
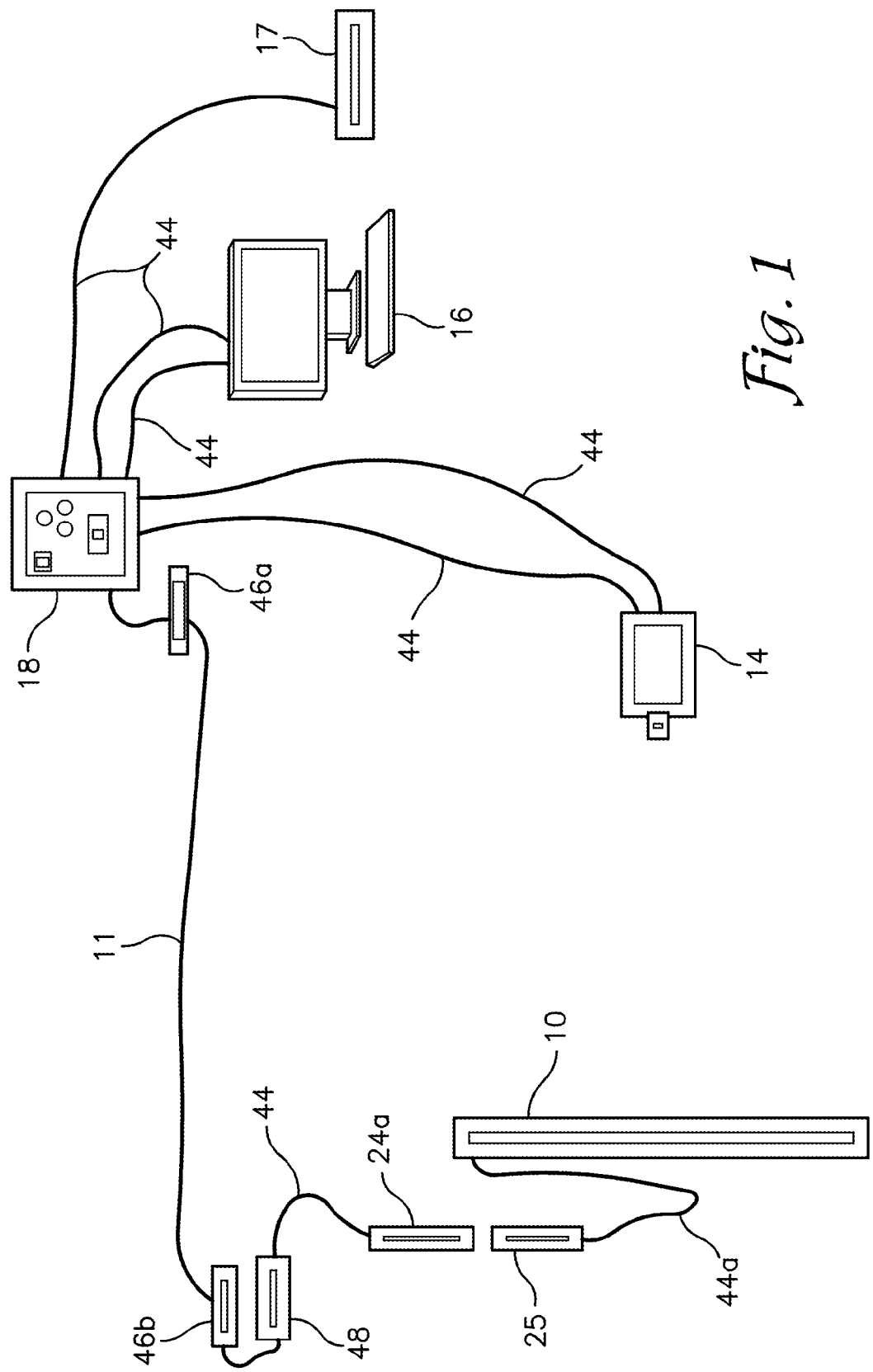
FIG. 1 is a system diagram of an embodiment of the present invention in an exemplary classroom environment.

Referring to the drawings in more detail, the reference numeral 8 generally designates an embodiment of a mobile whiteboard panel system with a moveable IWB 10 adapted for movement between an away and a home position with a floating connector 25 associated with the IWB 10 releasably coupled to a fixed connector 24a. The exemplary system depicted in FIG. 1 in which systems or methods described herein may be implement and may include a plurality of peripherals such as projector 14, media player 17 in electronic communication with an IWB content server 16 which may include a storage device (not shown). The IWB content server 16 and various system peripherals are depicted as being centrally connected to a data interface hub 18 for transmitting retrievably stored IWB content from the IWB content server 16 to the IWB 10 while in the home position via an electronic communications network 11. Additional content servers (not shown) in communication with IWB content server 16 may be provided for additional system features or for assisting in providing the disclosed system features. The network 11 illustrated in FIG. 1 includes typical data communication cables 44 for data communication between the various devices including wireless and wired communication. Data communication cables 44 may include VGA video, composite video, audio Cat 5 and USB cables and data communication using these types of cables would employ known communication standards. Wireless data may be transmitted to variously employed wireless devices along wireless and wired pathways using wired or wireless protocols for the transfer of the selected IWB content between the IWB 10 and the IWB content server 16. The wired and wireless communication pathways between various devices are referred to generally by reference number 44 and the network communications is generally referred to by reference number 11. Typical data networking components which are known and may be required during the transmission of the IWB content may generally be considered a part of the present system. While FIG. 1 shows a particular number and arrangement of system and peripheral devices, in practice, the system 8 may include additional, fewer, different, or differently arranged peripheral devices than are shown in FIG. 1. For example, the IWB content server 16 and media player 17 may be implemented as multiple, possibly distributed, devices or they may be implemented within a single device.

The mobile IWB 10 illustrated in FIG. 1, maybe alternatively referred to herein as IWB and located within an educational, instructional or entertainment environment with a plurality of various data cables 44 routed through the data interface hub 18 using various standardized connectors for the desired networked communication between the IWB 10 and the IWB content server 16 using various networked cables 11. The data cables 44 may include, but is not limited to, parallel cables, serial cables, packetized USB, VGA, composite video and stereo cables and composite video cables. Networked cables 11 may include standard WLAN networking cables and may include Cat V or Cat 6 cables. Alternatively, IWB content, also referred to herein as wallboard content, may be transmitted using known and later developed wireless topology as desired. Networking the depicted devices allows for electrical communication between and transmission of IWB content for use at the IWB 10 which may for example, but not as a limitation, facilitate teaching within a classroom environment. IWB content may include but is not limited to educational content, presentations, audio, visual, internet files, some combination of those referenced or other content which may be desirable in the employed environment such as, but not limited to a classroom, educational institutions, religious, business, conference center or other applicable environments.

As illustrated in FIG. 1, the IWB content may be accessed from retrievably stored data associated with the IWB content server 16 via data interface hub 18 and transmitted from there to the IWB 10 as illustrated in FIG. 1 along the network 11, for example but not as a limitation, the Cat5 or USB cables for transmission of the IWB content to the IWB 10 operably connected to fixed connector 24a by floating connector 25 while in the home position.

In an operational embodiment, an IWB user may interact with the mobile whiteboard panel system 8 during presentations, educational and entertainment activities by, for example, selecting content for display upon the IWB 10 which was previously stored on the IWB content server. The system 8 may then retrieve the selected IWB content from the IWB content server 16 by for example retrieving IWB content from an attached storage device (not shown) or the media player 17 and transmit the retrieved IWB content through the data interface hub 18 to a first data converter 46a where the IWB content may be converted as desired for network transmission via network 11a distance to a second data converter 46b where the IWB content may again be converted for transmission to the IWB 10 via the fixed connector 24a. A mini hub 48 may optionally be networked to the IWB 10 vis-a-vie the fixed connector 24a for connecting a plurality of data cables 44 or a plurality of data interface hubs 18 as desired by the employed environment. In addition, IWB content from the IWB content server 16 may be projected upon the IWB 10 by projector 14.

The IWB content server 16 may also be used to access electronically stored content located on an internal or external storage device or on storage media associated with the media player 17 which may be transmitted to various system peripheral devices like the projector 14. The electronically stored content may, for example, reside on a hard drive (not shown) associated with the IWB content server 16 or may be associated with storage media (not shown) adapted for use with the media player 17, such as but not limited to a DVD player, CD player or other media players with or without internal storage capabilities. In this way, the system 8 may be utilized to access a variety of IWB content from the IWB content server 16, the internet (not shown), and various media using the media player 17 which can be transmitted to the IWB 10 for use within the employed environment.

As further illustrated in FIG. 1, the IWB content server 16 may include generally known peripherals capable of receiving, storing, processing and transmitting IWB content such as, but not limited to, videos, photographs, audio recordings and transmitting them via network 11 to the IWB 10 through the data interface hub 18 or to a peripheral device such as, but not limited to the projector 14 for transmission upon the IWB 10.

In transmitting IWB content to the IWB 10 from the IWB content server 16, data may be transmitted via network 11 wirelessly or via data cables 44. Depending on the distance between the IWB 10 and the data interface hub 18, it may be desirable to convert or magnify the data communication signals using, for example, data converters 46a, 46b. The IWB content server 16 may include, but is not limited to traditional computing devices such as an internet device, a personal computer including, but not limited to, desktops, all-in-ones, laptops, tablets or a mobile communication devices such as, but not limited to, a cell phone, a personal digital assistant (PDA), a tablet, a smartphone, a wearable, a wrist computer, or another type of portable computing device, with the ability to be networked wired or wirelessly for communication with the system 8 to receive and transmit IWB content to the IWB 10.

If desired, the network 11 may include additional logic and/or communications peripherals to facilitate wireless access for the peripherals associated with the system 8 and may use various serial (such as but not limited to USB, IEE1394), parallel, SCSI, infrared, radio, Wi-Fi, Broadband (PPPoE), TCP/IP, WLAN networks (such as but not limited to 802.11a, 802.11b, 802.11f, 802.11g, 802.11n, 802.11ac), cellular networks such as, but not limited to (3G or 4G), or other commonly known network communication standards.

Although FIG. 1 shows exemplary devices for use by system 8, other implementations may contain fewer devices, different devices, differently arranged devices, or additional devices than depicted in FIG. 1. Alternatively, or additionally, one or more devices may perform one or more tasks described as being performed by one or more other devices.

Figure 2:
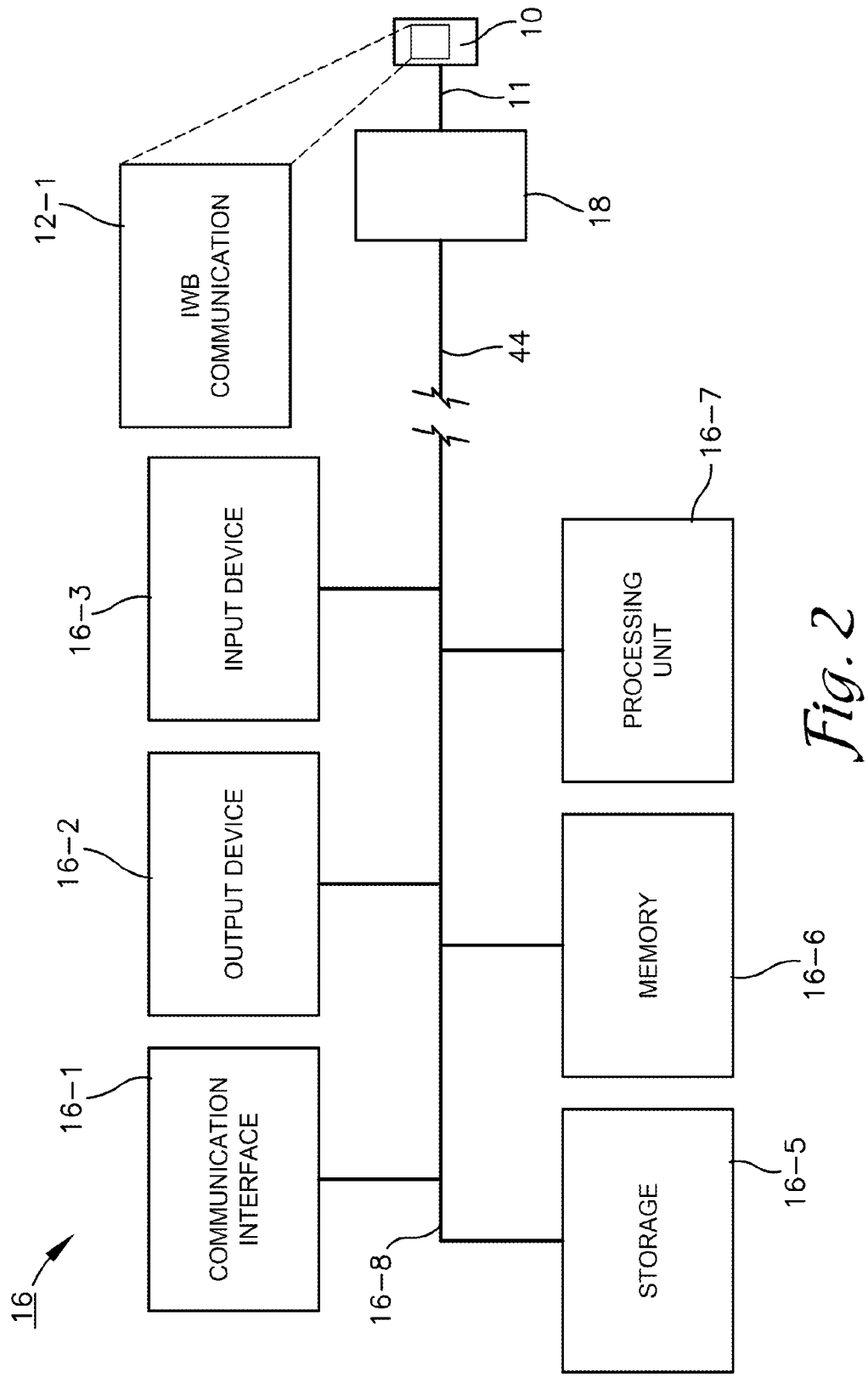
FIG. 2 is a diagram of exemplary components associated with an interactive whiteboard content server which may be used within the desired environment.

FIG. 2 is a diagram of exemplary components of IWB content server 16 that may be used within the operating environment of FIG. 1, including a classroom. IWB content server 16 may include various computing components such as an output device 16-2 such as a computer display screen or printer (not shown) for receiving various output data, an input device 16-3 for receiving input data including for example interaction data based upon interaction of the IWB user with the IWB content server 16 through for example a mouse or keyboard (not shown), a storage device 16-5 such as a hard drive or storage media (not shown) for retrievably storing IWB content, memory 16-6 and processor 16-7 in operable communication via bus 16-8, an interface communication interface 16-1 for receiving or transmitting IWB content between the IWB content server 16 and the IWB 10 via the IWB communication interface 12-1 in communication with the data interface hub 18, such as, but not limited to, a receipt or transmission of IWB content through the IWB communication interface 12-1 like an ftp server or streaming data server as further described below. Additionally, the IWB content server 16 may include a gateway server (not shown), a network server (not shown), a remote server (not shown) or any other system server desired in the operational environment of the present system 8.

Figure 2A:
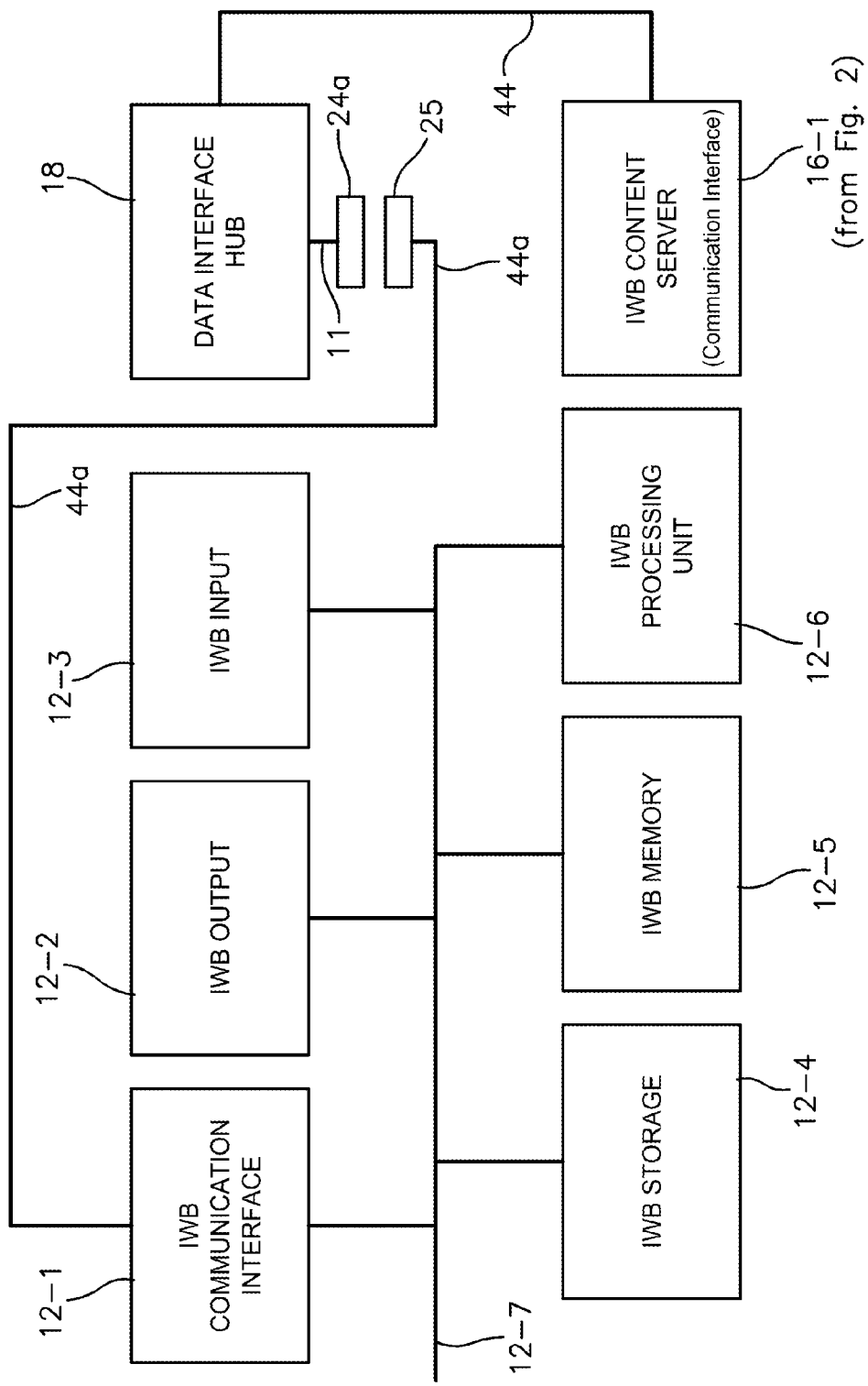
FIG. 2a is a diagram of exemplary components associated with an interactive whiteboard processor which may be used within the desired environment.

FIG. 2a is a diagram of exemplary components of IWB processor 12, alternatively referred to herein as wallboard processor, that may be used within the operating environment of FIG. 1, including a classroom. IWB processor 12 may include various computing components such as an IWB communications interface 12-1, an IWB output 12-2 such as for display on the IWB 10 (not shown) for displaying various processed data, an IWB input 12-3 for receiving receiving various IWB content from the IWB 10 for example interaction data based upon interaction of the IWB user with the IWB 10 through for example a user interface (not shown) at the IWB 10, an IWB storage 12-5 such as a hard drive or storage media (not shown) for retrievably storing IWB content, IWB memory 12-5 and IWB processing unit 12-6 in operable communication via bus 12-7 with the other IWB computing components. In operation, the IWB processor may receive IWB content from the IWB processing unit 12-6 or the IWB communications interface 12-1. IWB content from the IWB communications interface 12-1 may be transmitted from the IWB content server 16, by for example but not as a limitation, the communications interface 16-1 through the data interface hub 18 along the network 11 to the fixed connector 24a which when electrically coupled to the floating connector 25 allows for transmission of the IWB content to IWB communications interface 12-1.

IWB content server 16 may include the communications interface 16-1 which is in communication with other components via bus 16-8, a processing unit 16-7, memory 16-6, input device 16-3, output device 16-2 and storage 16-5. In another implementation, IWB content server 16 may include additional, fewer, different or differently arranged components. Communications interface 16-1 may control the transmission of various IWB content data along the bus 16-8 which may include a path, or collection of paths that permits communication among the components of the IWB content server 16.

Processing unit 16-7 and IWB processing unit 12-6 may include one or more processors, sockets, fractional processors or microprocessors that interpret and execute instructions related to the transmission, retrieval and storage or IWB content. Additionally or alternatively, processing unit 16-7 and IWB processing unit 12-6 may be implemented as or included in one or more application specific integrated circuits (ASICs), field programmable gate arrays (FPGAs), or another type of processor that interprets and executes instructions related to the transmission, retrieval and storage or IWB content.

The IWB processor 12 processes received IWB content as necessary for display by the IWB 10, for receiving IWB interactive data using various inputs associated with the IWB 10 or for selective transmission to the IWB content server 16 as desired. The IWB processor 12 may include additional components not illustrated in FIG. 2A as readily understood by those familiar with interactive white boards.

Memory 16-6 and IWB memory 12-5 may include memory or secondary storage. For example memory 16-6 and IWB memory 12-5 may include a random access memory (RAM) or another type of dynamic storage device that stores information or instructions for execution by processing unit 16-7 and IWB processing unit 12-6 respectively. Additionally, or alternatively memory 16-6 and IWB memory 12-5 may include read only memory (ROM) or another type of static storage device that stores static information or instructions for use by processing unit 16-7 and IWB processing unit 12-6 respectively. Storage 16-5 and IWB storeage 12-4 are data storage devices for retrievably storing IWB content data or information for use by the system 8 or the IWB 10 and may include various storage medium such as, but not limited to, hard drives using magnetic storage medium, flash memory, solid state, hybrid or a combination of the technologies or removable memory such as flash memory.

Input device 16-3 and IWB input 12-3 may include a mechanism that permits an IWB user to input information into IWB content server 16, the IWB 10 or transmit it to the IWB 10 such as a control button, a keyboard, a keypad, a touch pad, radio signal, and location device like a GPS signal, one or more biometric mechanisms or other type of input device. Output device 16-2 and IWB output 12-2 may include a mechanism that outputs IWB content to the IWB 10 or the IWB user, such as a light emitting diode (LED), a display, a speaker, or other type of visual, audio or textual output device.

Communications interface 16-1 may include a component that permits IWB content server 16 to communicate with other peripheral devices such as but not limited to a transceiver-like mechanism which permits communication via wired and/or wireless networks 11.

IWB Communications interface 12-1 may include a component that permits IWB 10 to communicate with other system components such as but not limited to the IWB content server 16 via the data interface hub 18 in the home position with the fixed connector 24a electrically coupled to the floating connector 25.

IWB content server 16 may perform certain operations as described in detail below in response to processing unit 16-7 executing instructions related to the display, transmission or storage or IWB content contained in a computer-readable medium, such as memory 16-6. A computer-readable medium may be defined as a non-transitory memory device. The memory device 16-6 may include space within a single physical memory device or spread across multiple physical memory devices.

The instructions may be read into memory 16-6 from another computer-readable medium, such as a storage device, or from another device via communication interface 16-1. The instructions contained in memory 16-6 may cause processing unit 16-7 to perform processes that will be described later. Alternatively, hardwired circuitry may be used in place of or in combination with instructions to implement processes described herein. The implementations described herein while not limited to any specific combination of hardware circuitry and software, are related to the transmission, display and storage or IWB content.

Some exemplary components which may be utilized by the IWB content server 16 include a processing unit 16-7 and input devices 16-3 such as a keyboard and a mouse and an attached media player 17. In an exemplary operational embodiment, the media player 17 may provide analog or digital signals representing both video and audio data which may be electronically transmitted for example, through appropriate cabling 44 to the data interface hub 18 for propagation to the projector 14 for transmission to the outer surface of the IWB 10 or for transmission to the IWB 10 or to another output device e.g. a speaker (not shown). In some situations, the IWB 10 may collect and transmit data from the IWB 10 to the IWB content server 16 for retrievable storage in the previously configured storage 16-5. Upon receipt by the IWB 10 of the IWB content from the IWB content server, an IWB processor 12 may be utilized to receive and process the transmitted IWB content.

Figure 13:
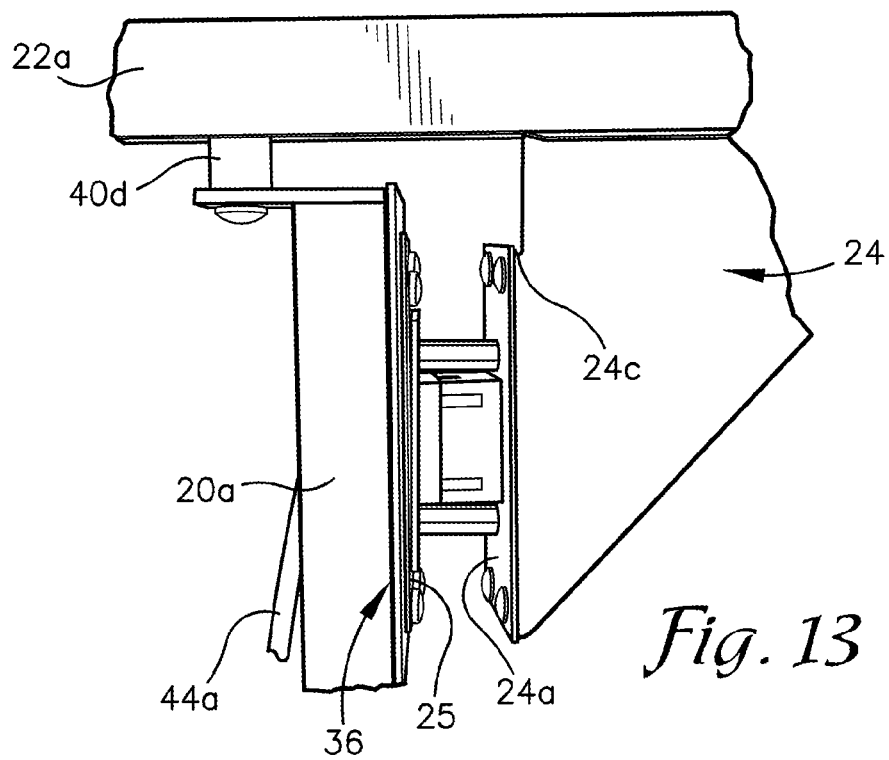
FIG. 13 is a fragmented top perspective view of the IWB in the home position in accordance with an aspect of the present invention.

In operation, the IWB 10 is moved from the away position towards the home position as illustrated in FIG. 3. Generally, in the home position, at least one pair of contacts such as the fixed and floating connectors 24a, 25 are electrically coupled for transmission of IWB content data therebetween. As illustrated, when the IWB 10 is positioned at the home position, the floating connector bracket 36 is aligned with a fixed connector bracket 24 whereby at least one alignment pin 32 is at least partially received bay at least one alignment receiver 34a and as illustrated in FIG. 13 two alignment pins 32 are received by two alignment receivers 34a.

Figure 4:
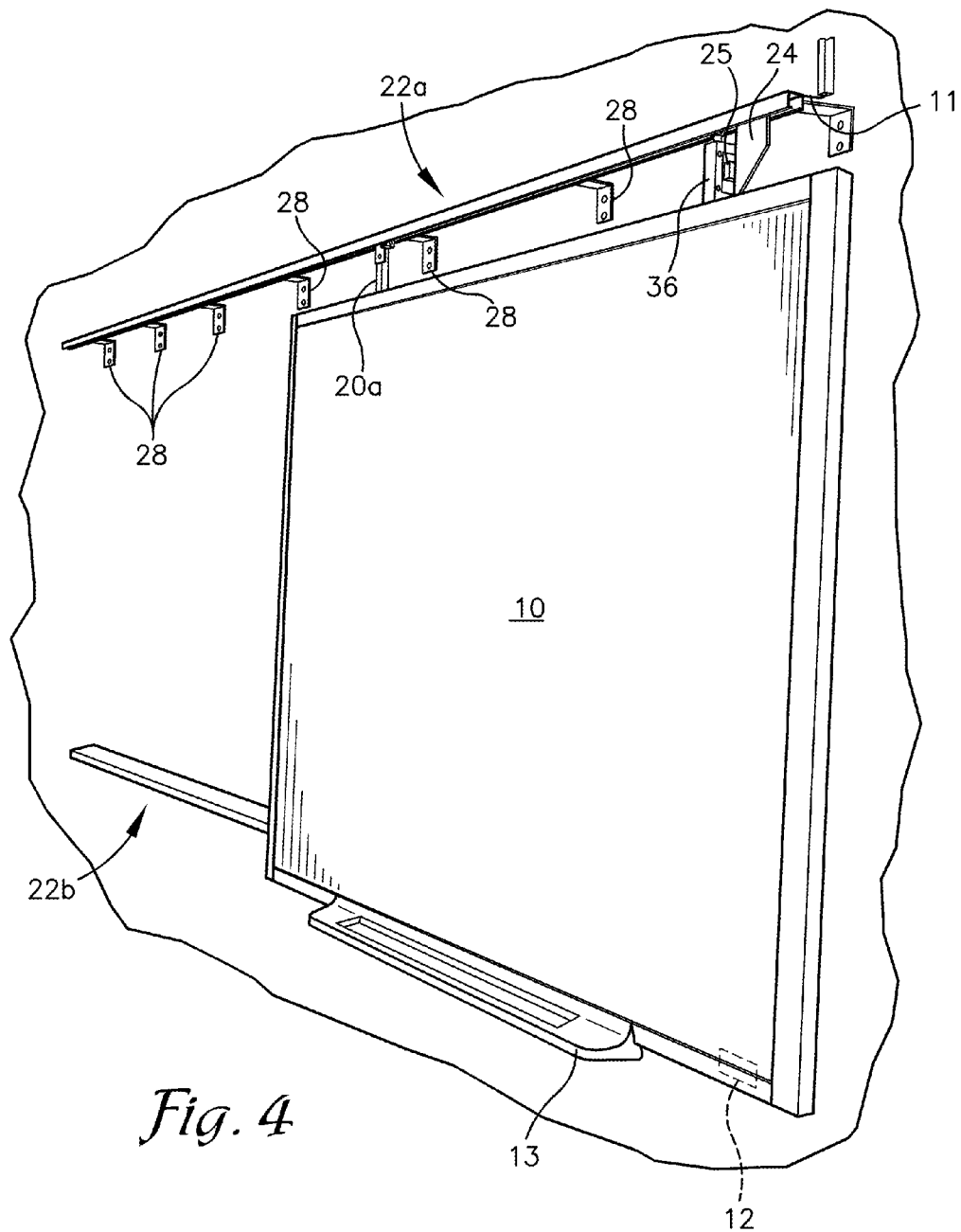
FIG. 4 is fragmented side perspective of an alternative IWB in an away position with a vertical surface having a horizontal projection extending outwardly therefrom.

FIGS. 3 and 4 illustrate the IWB 10 including the moveable mounting frame 20 and positioned in the away position in FIG. 3 with the fixed connector 24a spaced from the floating connector 25. FIG. 4 illustrates the IWB 10 positioned generally in the home position with the fixed connector 24a electronically coupled to the floating connector 25. In addition, an optional IWB tray 13 extending along the outer surface of the IWB 10. The depicted IWB tray 13 may store various IWB accessories or tools such as IWB markers, IWB highlighters or IWB remote controllers.

In the illustrated embodiment of FIG. 3, the fixed connector 24a extends vertically from the upper rail 22a while the floating connector 25 is associated with the movable mounting frame 20. In the illustrated embodiment, both the fixed and floating connectors 24a, 25 extend vertically down from the upper rail 22a. Alternatively, the fixed and floating brackets 24, 36 may extend up from the upper rail 22a or may be associated with the lower rail 22b, or may be configured in a variety of alternative positions as long as the fixed and floating connectors 24a, 25 are sufficiently aligned to provide for electronic communication therebetween as understood by other for the transmission of IWB content therebetween. In operation, the IWB 10 can be selectively positioned along the upper and lower rails 22a, 22b for desired placement within the desired operational environment between the home position and the away position. In this way the movable IWB 10 can be rolled along the upper and lower rails 22a, 22b when electronic communication between the IWB 10 and the IWB content server 16 is not required.

The movable mounting frame 20 may include a supporting structure, which as illustrated in FIG. 3, includes a pair of uprights 20a at least partially spanned by a pair of horizontal members 20b. The uprights 20a extend between a first and second roller assembly 40a, 40b and allow for vertical adjustment of the mounted IWB 10 to the mounting frame 20 with a plurality of fasteners (not shown). In the exemplary embodiment illustrated in FIG. 3, the floating connector bracket 36, also referred to herein as a floating bracket, generally extends outwardly from one of the uprights 20a and generally moves along the upper rail 22a with the IWB 10 between the home and away positions.

Figure 11:
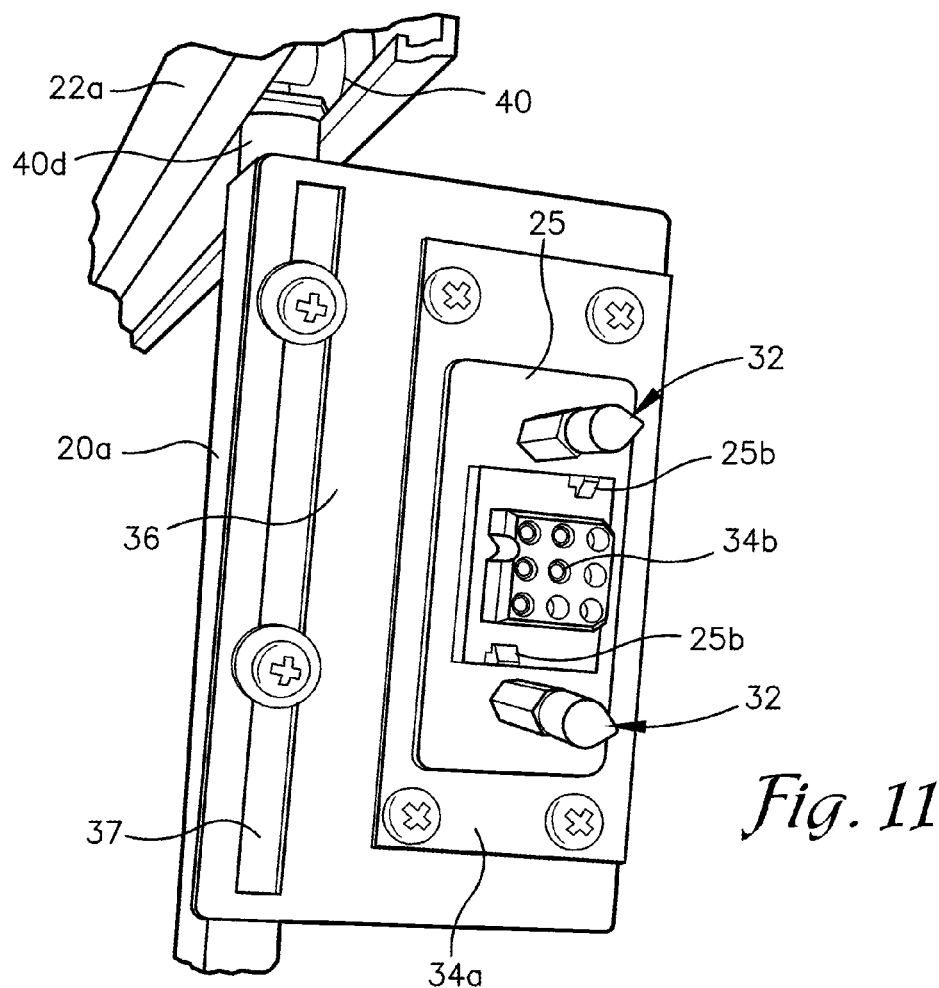
FIG. 11 is a fragmented side perspective illustrating a floating connector in accordance with one embodiment of the present invention.
Figure 12:
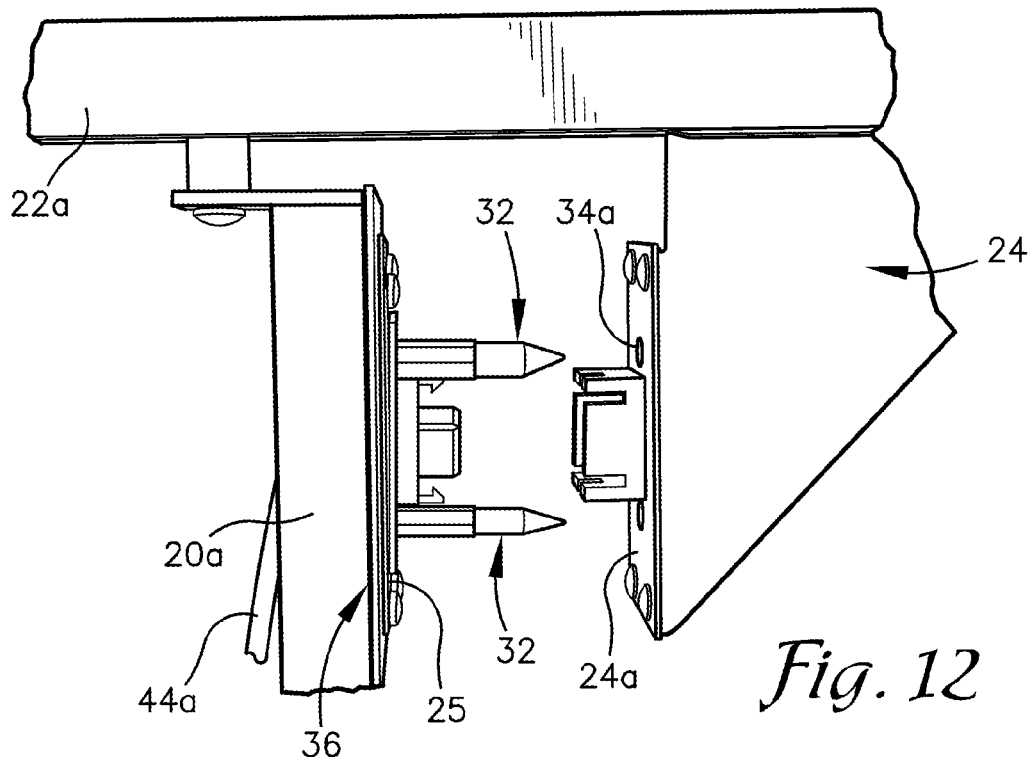
FIG. 12 is a fragmented top perspective view of the IWB in the away position in accordance with an aspect of the present invention.

As further illustrated in FIGS. 11-12 the floating bracket 36 receives and supports a connector mounting plate 34a from which the floating connector 25 and guide pins 32 outwardly extend. The illustrated floating connector 25 includes a generally rectangular base 25 with a pair of engaging members 25b adapted for releasable engagement with the fixed connector 24a. The engaging members 25b illustrated in FIG. 11 include barbed tips which extending outwardly from the floating connector 25 offset on opposite sides of the floating connector 25. In general, the engaging members 25b project outwardly from the connecting bracket 36 towards a distal end associated with the barbed tip adapted for secure engagement with channel 29 of the fixed connector 24a.

The fixed connector 24a includes a generally rectangular sidewall 24b with a pair of lateral channels 29 extending through the sidewall 24b. In general, each of the channels 29 has complimentary structure adapted for releasable engagement between the floating connector 25 and fixed connector 24a. The floating connector 25 has complementary engagement structure for engagement with the floating connector 25 and as depicted in the illustrated embodiment includes generally female connecting structure, the fixed connector 24a including generally male connecting structure.

As further depicted in FIGS. 10 and 11, the floating connector 25 includes a plurality of electrical receivers electrically isolated from each other, each electrical receiver 25c having sufficient structure for receiving one of a plurality of electrically conductive pins 24d associated with the fixed connector 24a. In the home position illustrated in FIGS. 4 and 13, the connecting bracket 36 is electrically connected to the conductor bracket 36b with the floating connector 25 engaging the fixed connector 24a to form an electrically conductive connection with the IWB 10 and the system 8. The away position is generally illustrated in FIG. 12 with the IWB 10 electrically separated from the system 8, with the floating connector 25 released and spaced apart from the fixed connector 24a. Optionally, the floating connector 25 and fixed connector 24a could utilize alternative connecting means as understood by others including reversing the male and female structures to provide a releasable engaging electrical connection for communication between the IWB 10 and the other peripherals disclosed within the system 8.

The first roller assembly 40a extends upwardly beyond the upright 20a for receipt within the upper rail 22a. The roller assembly 40 generally allows the floating bracket 36 to be rolled around the desired environment along the upper rail 22a as desired for placement of the IWB 10 within the desired position between the home position and the away position.

The relatively fixed bracket 24 is generally secured to and extends from the upper rail 22a as illustrated in FIG. 3. The fixed bracket 24 is illustrated in FIG. 3 with a leading edge 36c on the right side and FIGS. 12 & 13 the leading edge 36c associated with the fixed bracket 24 is on the left side. Generally, the illustrated embodiment of the fixed bracket 24 has a generally trapezoidal configuration with leading edge 36c associated with the fixed bracket 24 presenting the fixed connector 24a mounting plate 34b. When the IWB 10 is positioned in the home position as illustrated in FIG. 13, the leading edge 36c is facing and separated from the floating bracket 36 a distance generally defined by the coupled connectors (fixed and floating) 24a, 25.

The fixed bracket 24 is generally adapted for presenting the first electrical contact, also referred to as the fixed connector 24a, associated with the conductor mounting plate 34b and alignment of the floating bracket 36 associated with the second electrical contact, also referred to as the floating connector 25, for aligned coupling and electrical communication with the IWB 10 while in the home position. The fixed connector 24a is adapted for coupled engagement with the floating connector 25 while the IWB 10 is in the home position, as depicted in the embodiment of FIG. 13. While coupled, the fixed and floating connectors 24a, 25 facilitate electronic communication between the IWB 10 and the IWB content server 16 along with other components of system 8.

For aligned coupling of the floating bracket 36 with the fixed bracket 24, the pair of alignment pins 32 are provided, which as illustrated in FIGS. 11 & 12 extend centrally outwardly from the connector mounting plate 34a. Floating bracket 36 is illustrated with a generally rectangular plate having an elongated channel 37 which allows for vertical and horizontal adjustment of the floating bracket 36 for aligning the fixed and floating connectors 24a, 25. IWB content may be prevented from being transmitted from the IWB content server 16 to the IWB 10 if the fixed and floating connectors 24a, 25 are not properly aligned. Vertical and horizontal adjustments of the floating bracket 36 may be required to properly align the fixed and floating connectors 24a, 25 which corresponding to the fixed and floating brackets 24, 36. The elongated channel 37 provides for making the necessary horizontal and vertical adjustments for ensuring electrical conductivity between the fixed and floating connectors 24a, 25.

The connector mounting plate 34a generally extends rearwardly from the elongated channel 37 with the alignment pins 32 and floating connector 25 centrally located on the connector mounting plate 34a extending from the floating bracket 36 and presenting the floating connector 25.

The alignment pins 32 illustrated in FIG. 11 have a proximal and distal end, the proximal end having an outer diameter greater than the outer diameter of the distal end which as illustrated are tapered. The tapered distal end of the alignment pins 32 facilitates alignment of the fixed and floating brackets 24, 36 for aligned electronic coupling of the fixed and floating connectors 24a, 25. A complementary pair of alignment receivers 32a are provided, each alignment receiver 32a adapted for receiving the distal end of one alignment pin 32 for alignment of the floating connector 25 with the fixed connector 24a during coupling of the connectors 25, 24a. In an alternative embodiment, one or both the connector mounting plate 34a and conductor mounting plate 34b may include slotted mounting holes adapted for receipt of mechanical fasteners in an adjustable manner for alignment and coupling of the fixed and floating connectors 24a, 25.

Figure 5:
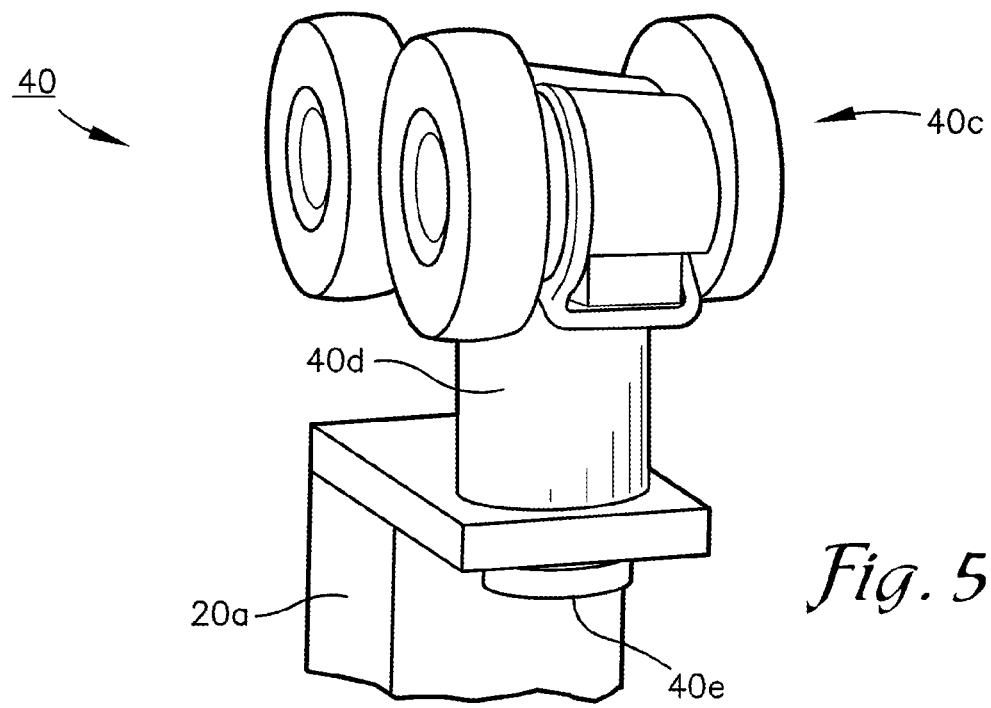
FIG. 5 is a fragmented front perspective of a roller assembly in accordance with an aspect of the present invention.
Figure 8:
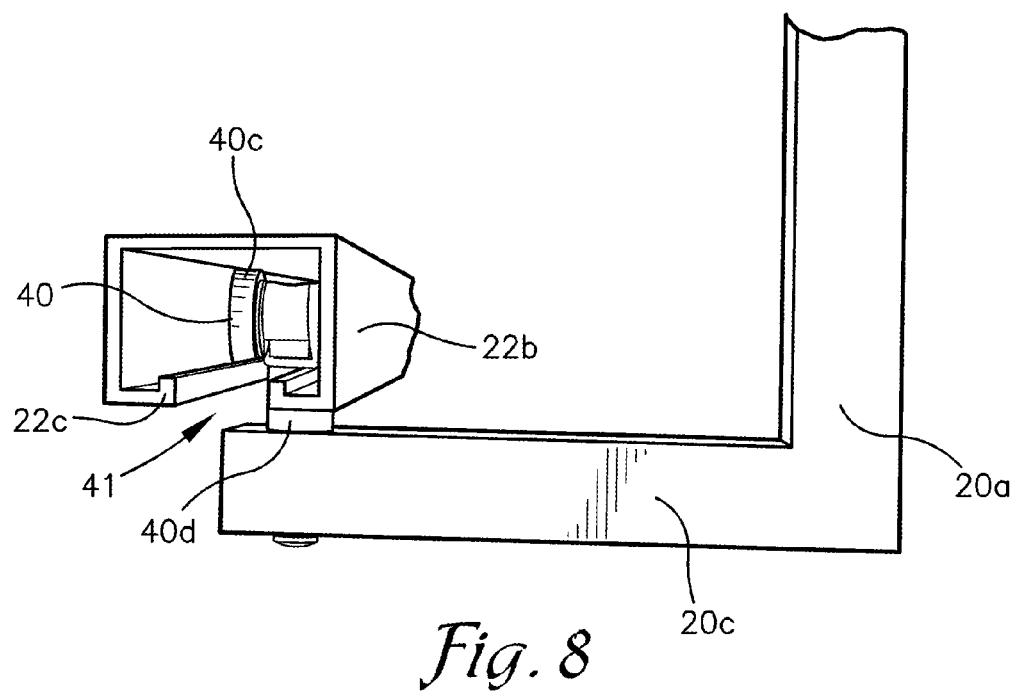
FIG. 8 is a fragmented side perspective of the lower rail in accordance with an aspect of the present invention.

A roller assembly 40 is illustrated in FIG. 5 having a plurality of rollers each with a circular rolling surface 40c being generally secured to and extending from the upright 20a of the mounting frame 20 generally associated with the IWB 10. The depicted roller assembly 40 is in the illustrated embodiment, identical for upper and lower roller assemblies 40a, 40b with The illustrated roller assembly 40 includes three rolling surfaces 40c, alternative configurations may be provided with varying rolling surfaces 40c as desired herein. A spacer 40d allows for positioning the rolling surfaces 40c a distance from the mounting frame 20 to allow for movement of the IWB 10 around the desired environment, the roller assembly 40 being generally rotatable during movement of the IWB 10. As depicted by FIG. 8, 11a roller assembly 40 may be received within both the upper and lower rails 22a, 22b for rolled movement of the IWB 10 using rolling surfaces 40c adapted for rotation within the rails 22a, 22b. A fastener 40e secures the roller assembly 40 to the mounting frame 20.

Figure 6:
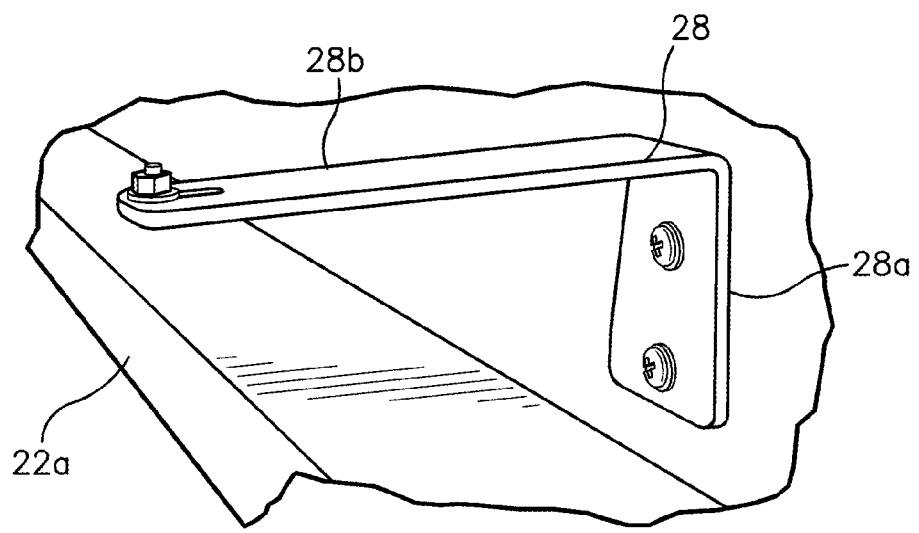
FIG. 6 is a fragmented side perspective of an upper rail in accordance with an aspect of the present invention.

FIG. 6 illustrates an upper rail bracket 28 which spaces the upper rail 22a a sufficient distance from the classroom wall. As illustrated the upper rail bracket 28 has a mounting surface 28a and a support surface 28b, the mounting surface 28a being adapted for securing the upper rail bracket 28 to the wall with for example standard mechanical fasteners. The support surface 28b is fastened to the upper rail 22a with mechanical fasteners, providing vertical support of the upper rail 22a and may include at least one slotted receiver (not shown) to allow for adjustment of the upper rail 22a or for allowing for adjustments of the upper rail. The rail can be mounted straight even though the classroom walls may not be straight. A plurality of upper rail brackets 28 having sufficient dimensions are spaced along and between the classroom wall and the upper rail 22a to provide vertical support of the system 8 while in operation in the classroom environment.

Figure 7:
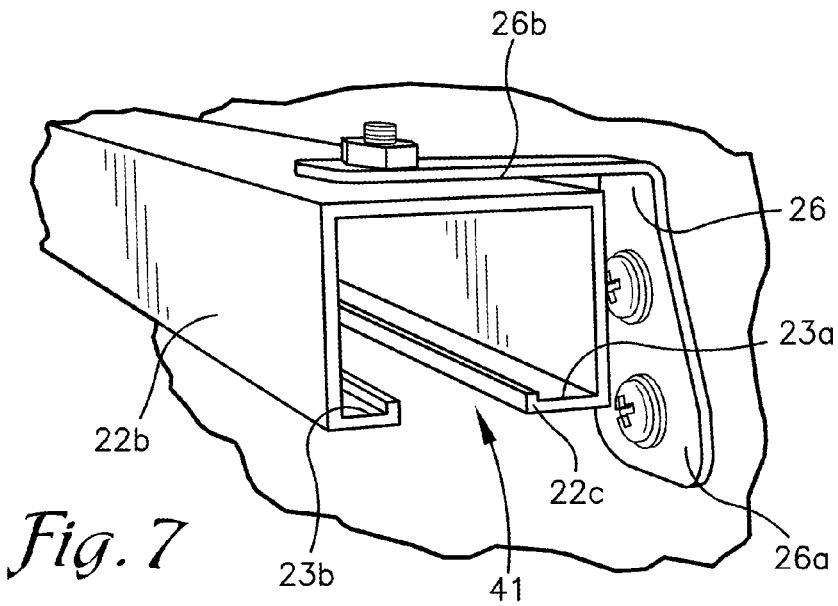
FIG. 7 is a fragmented side perspective of a lower rail in accordance with an aspect of the present invention.

FIG. 7 illustrates a lower rail bracket 26 which spaces the lower rail 22b a sufficient distance from the vertical wall surface. As illustrated the lower rail bracket 26 has a mounting surface 26a and an support surface 26b, the lower rail mounting surface 26a being adapted for securing the lower rail bracket 26 to the wall with for example standard mechanical fasteners. The lower rail support surface 26b is fastened to the lower rail 22b with mechanical fasteners, providing vertical support of the lower rail 22b and may include at least one slotted receiver (not shown) to allow for adjustment of the upper rail 22a. A plurality of lower rail brackets 26 having sufficient dimensions are spaced between the vertical surface (wall) and the lower rail 22b to provide vertical support of the system 8 while in operation in the desired environment.

A central guide 41 is illustrated in FIGS. 7-8 which extends centrally along the upper and lower rails 22a, 22b and is adapted for receipt of the corresponding roller assembly 40a, 40b. The central groove includes As illustrated in FIG. 8, at least one support leg 20c extends angularly from the lower region of the upright 20a towards the underlying vertical surface, like the classroom wall. The support leg 20c generally presents the second roller assembly 40b which extends upwardly from the support leg 20c for receipt by the lower rail 22b. The second roller assembly 40b rotates within the lower rail 22b for reciprocal movement of the IWB 10 as desired along the lower rail 22b as the IWB 10 is moved between the home position and the away position. The support leg 20c illustrated in FIG. 8 is of sufficient length to allow for movement of the IWB 10 without being obstructed by a horizontally extending surface like the illustrated chalk tray associated with an underlying chalkboard as illustrated in FIG. 1.

FIGS. 7-8 illustrated a centrally guide 41 presented by the upper and lower rails 22a, 22b which is adapted for receipt of the first and second roller assemblies 40a, 40b. The central guide 41 presents a first track 23a separated a distance from a second track 23b, the distance corresponding to the distance between the rolling surfaces 40c of the first and second roller assemblies 40a, 40b. The upper and lower rails 22a, 22b includes a pair of upending lips 22c which are adapted for receiving the roller assemblies 40a, 40b. During reciprocal movement of the IWB 10 along the vertical wall surface between the home and away positions, the upending lips 22c maintains the roller assemblies 40a, 40b. The tracks 23a, 23b encircled by the inner portions of the upper and lower rails 22a, 22b and separated by the upending lips 22c have sufficient width and height for rotation of the rolling surfaces 40c during the desired movement of the IWB 10.

A rail connector 27 is illustrated in FIG. 9 which is used to join two sections of standard length railing together as the railing is extended along the classroom. The rail connector 27 can be used to join adjacent segments of upper and/or lower rails 22a, 22b. The rail connector 27 may have an "C" configuration and be mechanically fastened to adjacent railing segments. Alternatively, the rail connector 27 may have a channeled configuration for receiving a connector to support and affix adjacent rail segments. The connector has sufficient dimensions for being mechanically fastened to adjacent railing segments. In this way, the system 8 can utilize standard length railing sections without the necessity of custom building railings for each classroom and allowing for rapid installation and greater cost savings. Alternatively, the rail connector 27 may be used to splice adjacent rail sections when rails are field cut to maximize use of wall space to allow the IWB 10 to be moved more fully out of the way.

As further illustrated in FIG. 10, the fixed connector 24a is configured as a female connector with a plurality of guided receivers 34a and a plurality of electrical pin receivers 34b. Each of the guided receivers 34a is adapted receipt of one alignment pin 32 wherein the guided receivers 34a align the floating connector 25 associated with the floating bracket 36 such that each of the plurality of electrical connectors 34b is received by an electrical connector receiver 33b.

As illustrated in FIG. 11, the male portion of the floating connector 25 may include a sufficient number of electrical pin connectors 33b adapted for receipt by the electrical pin receivers 34b to support standard data transmission protocols such as but not limited to serial, parallel and packet based communication protocols such as USB. The male portion of the floating connector 25 illustrated in FIG. 11 includes a plurality of pin connectors 33b.

Figure 14:
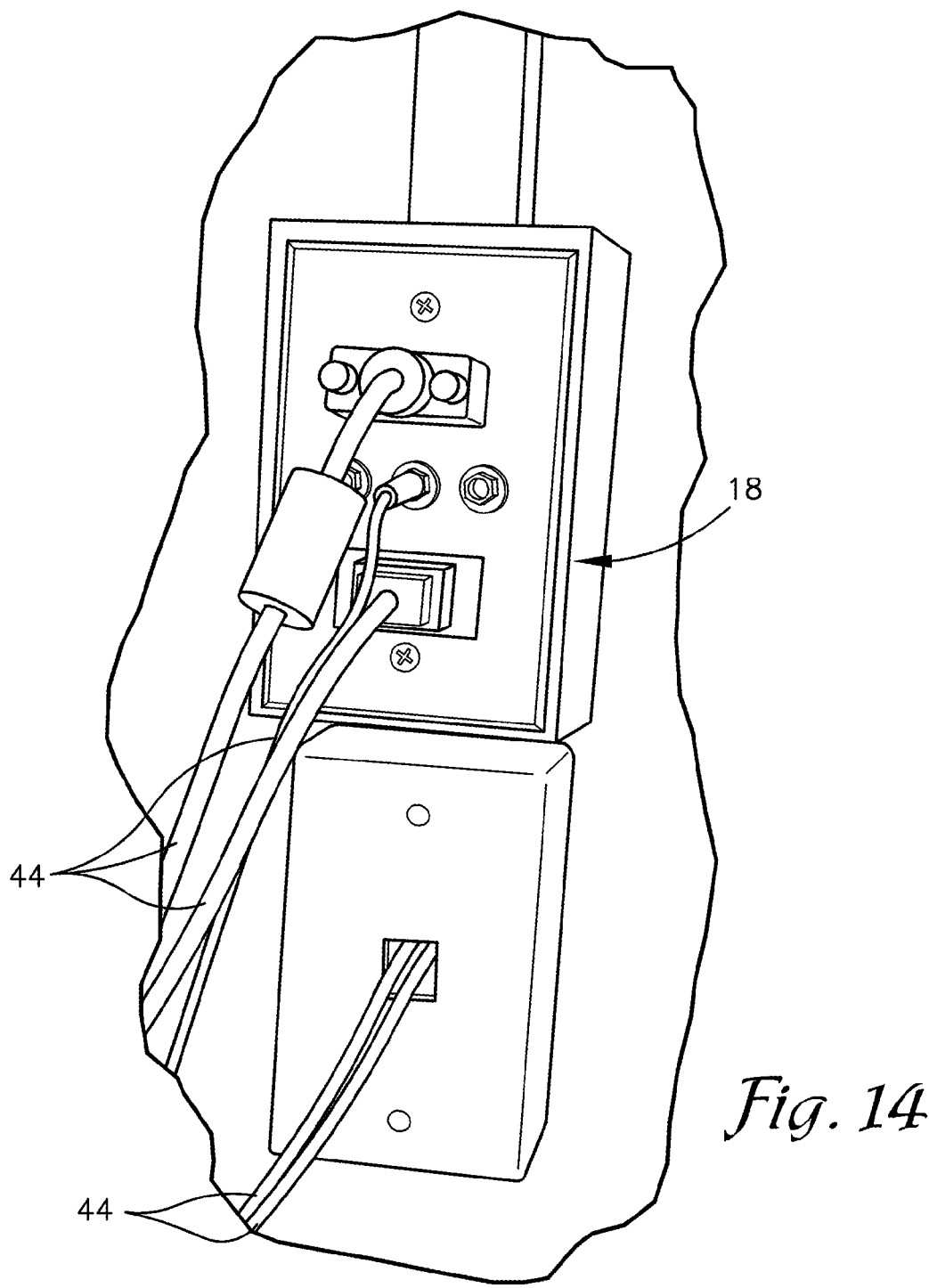
FIG. 14 is a fragmented side perspective of an exemplary data interface hub in accordance with one embodiment of the present invention.

FIG. 14 illustrates the data interface hub 18 which as illustrated may be used to transmit data from the IWB content server 16 to the IWB 10 and projector 14 which includes a plurality of data communication ports for use in communicating with various system component including VGA computer video, composite video, USB and audio speakers. In operation, instructional content may be transmitted from the IWB content server 16 for display on the IWB 10. The data interface hub 18 will receive the instructional content from the IWB content server 16 using for example USB communications cabling. However, in some cases it may be desired to convert the signal, when for example the serial communications is required to travel a long distance. Generally, USB cables are expensive and inefficient to run a great distance such as the length of the classroom so the data interface hub 18 may receive IWB content from the IWB content server 16 and convert it with a converter 46 such as, but not limited to, a packet to serial communications device 19 for serial transmission over standard cables for display on the IWB 10. Additionally, it may be beneficial to convert varying communication signals to a few or a single communications protocol in order to only have to run a single data transmission cable capable of carrying all IWB content to the IWB 10 capable of transmitting and receiving the IWB content around the desired environment. Because IWB content data may be transmitted between the IWB 10 and the IWB content server 16, the reverse network communications may also be necessary. For example, once the IWB 10 is positioned in the home position with the floating connector 25 in electronic communication with the fixed connector 24a, IWB content may be transmitted from the IWB 10 to the mini hub 48 and then converted using a converter 46 from packet based communications protocol such as USB to a serial based protocol for transmission to the data interface hub 18 and then converted again using a second data converter 46 to a packet based protocol for receipt by the IWB content server 16.

It is to be understood that while certain forms of the present invention have been illustrated and described herein with reference to the accompanying drawings, it is to be understood that various changes and modifications will become apparent to those skilled in the art. Such changes and modifications are to be understood as being included within the scope of embodiments of this invention as defined by the appending claims.

What is claimed and desired to be secured by Letters Patent:

1. An interactive mobile wall panel system for transmitting wallboard content to an interactive wallboard moveable along a vertical surface between a home to an away position, said interactive wall panel system comprising;
    an upper rail and a lower rail secured to the vertical surface, said upper and lower rails presenting a central guide, said upper rail receiving an upper roller assembly, said lower rail receiving a lower roller assembly,
    a fixed bracket extending from and secured to one of said upper and said lower rail, said fixed bracket presenting a fixed connector;
    a floating bracket extending from said interactive wallboard and presenting a floating connector engaged to said fixed connector at said home position,
    a data interface hub in electronic communication with said interactive wallboard for transmission of said wallboard content thereto; and
    a wallboard content server having said wallboard content electronically stored thereon, said wallboard content server being in electronic communication with said interactive wallboard at said data interface hub for selective transmission of said wallboard content thereto during operation of said interactive wallboard at said home position.

2. The interactive mobile wall panel system of claim 1 wherein said interactive wallboard further comprises a mounting frame extending between said upper rail and said lower rail.

3. The interactive mobile wall panel system of claim 1 wherein said interactive wallboard further comprising a wallboard processor in electronic communication with said floating connector.

4. The interactive mobile wall panel system of claim 1 wherein said wallboard content server further comprises a media player.

5. The interactive mobile wall panel system of claim 1 wherein said floating bracket further comprises an elongated channel which allows for vertical and horizontal adjustment of the floating bracket.

6. The interactive mobile wall panel system of claim 1 wherein at least one of said upper rail and lower rail includes an upending lip.

7. The interactive mobile wall panel system of claim 1 further comprises a rail connector.

8. The interactive mobile wall panel system of claim 1 wherein said floating connector includes at least one alignment pin and said fixed connector includes at least one alignment receiver wherein said alignment receiver receives said alignment pin at said home position.

9. The interactive mobile wall panel system of claim 1 wherein said fixed connector includes at least one engaging member and said floating connector includes at least one channel adapted for engagement by said engaging member, wherein fixed connector is coupled to said floating connector during engagement of said channel by said engaging member.

10. A method for transmitting wallboard content through an interactive wall panel system including a wallboard content server and an interactive wallboard, the method comprising the steps of:
    installing an upper rail and a lower rail around a vertical surface;
    mounting an interactive wallboard with a wallboard processor on a moveable mounting frame between said upper rail and said lower rail;
    installing a floating connector on said moveable mounting frame and electronically connecting said floating connector to said wallboard processor;
    installing a fixed connector adapted for engagement by said floating connector to said upper rail;
    retrievably storing wallboard content on the wallboard content server;
    electronically connecting a data interface hub between said wallboard content server and said fixed connector; and
    coupling said fixed connector to said floating connector whereby wallboard content is selectively transmitted from said wallboard content server to said interactive wallboard.

* * * * *